US012298584B2

(12) United States Patent
Ansell et al.

(10) Patent No.: US 12,298,584 B2
(45) Date of Patent: May 13, 2025

(54) REDUCING FIBRE OPTIC CABLE TUBE CONNECTOR (71) Applicant: RELIANCE WORLDWIDE CORPORATION (UK) LIMITED, West Drayton (GB)

(72) Inventors: Glen Ansell, West Drayton (GB); Joshua Smith, West Drayton (GB); James Fade, West Drayton (GB)

(73) Assignee: Reliance Worldwide Corporation (UK) Limited, Middlesex (GB)

( * ) Notice: Subject to any disclaimer, the term of this patent is extended or adjusted under 35 U.S.C. 154(b) by 20 days.

(21) Appl. No.: 18/260,685

(22) PCT Filed: Dec. 21, 2021

(86) PCT No.: PCT/EP2021/087106
§ 371 (c)(1),
(2) Date: Jul. 7, 2023

(87) PCT Pub. No.: WO2022/148645
PCT Pub. Date: Jul. 14, 2022

(65) Prior Publication Data
US 2024/0053566 A1 Feb. 15, 2024

(30) Foreign Application Priority Data
Jan. 8, 2021 (GB) ...................................... 2100241

(51) Int. Cl.
*F16L 37/092* (2006.01)
*F16L 37/107* (2006.01)
*G02B 6/44* (2006.01)

(52) U.S. Cl.
CPC ........ *G02B 6/4459* (2013.01); *F16L 37/0925* (2013.01); *F16L 37/107* (2013.01)

(58) Field of Classification Search
CPC . F16L 37/0928; F16L 37/0847; F16L 37/096; F16L 37/098; F16L 25/14
See application file for complete search history.

(56) References Cited

U.S. PATENT DOCUMENTS 2,899,217 A * 8/1959 Ashbrook et al. .. F16L 37/0925
285/369
5,171,045 A * 12/1992 Pasbrig ............... F16L 37/0925
285/308

(Continued)

FOREIGN PATENT DOCUMENTS

CN 205001712 U * 1/2016 ............. F16L 25/14
EP 0333950 A1 * 9/1989 .......... F16L 37/0925

(Continued)

OTHER PUBLICATIONS

Search Report; Patent Application No. GB2100241.5; Aug. 26, 2021.

(Continued)

*Primary Examiner* — Matthew Troutman
*Assistant Examiner* — Fannie Kee
(74) *Attorney, Agent, or Firm* — Barnes & Thornburg, LLP (57) ABSTRACT A reducing fibre optic cable tube connector with a plastic body having a connector at either end for connection to a respective tube. The body has a wide portion terminating at a wide end and a narrow portion terminating at a narrow end to receive tubes of a different diameters. The two portions meet at a central region of the body. Each portion includes an annular inner sleeve extending from the central region and spaced from an inner wall of the outer body to define an air gap. At the central region the annular sleeves extend toward one another so the first and second air gaps are axially spaced by less than 1 mm.

18 Claims, 7 Drawing Sheets (56) References Cited

U.S. PATENT DOCUMENTS

| | | | |
|---|---|---|---|
| 5,951,058 A * | 9/1999 | Dickinson | F16L 37/0925 |
| | | | 285/21.2 |
| 6,517,124 B1 * | 2/2003 | Le Quere | F16L 37/0925 |
| | | | 285/379 |
| 7,270,349 B2 | 9/2007 | Bamberger et al. | |
| 2005/0242581 A1 | 11/2005 | Nowling et al. | |
| 2009/0263186 A1 * | 10/2009 | Hofmann | F16L 37/0925 |
| | | | 285/317 |
| 2022/0112974 A1 * | 4/2022 | Ansell | F16L 37/0925 |
| 2024/0167601 A1 * | 5/2024 | Norman | F16L 37/0925 |

FOREIGN PATENT DOCUMENTS

| | | | | |
|---|---|---|---|---|
| EP | 0347279 A1 * | 12/1989 | | F16L 37/0925 |
| EP | 0351466 A1 | 1/1990 | | |
| EP | 1359363 A2 * | 11/2003 | | F16L 37/0925 |
| GB | 2602652 A * | 7/2022 | | F16L 37/098 |
| WO | WO-2016041989 A1 * | 3/2016 | | F16L 37/0925 |
| WO | 2021005041 A1 | 1/2021 | | |
| WO | 2021005100 A1 | 1/2021 | | |
| WO | 2021005319 A1 | 1/2021 | | |

OTHER PUBLICATIONS

Search Report and Written Opinion; Patent Application No. PCT/EP2021/087106; Apr. 7, 2022.

* cited by examiner

REDUCING FIBRE OPTIC CABLE TUBE CONNECTOR

PRIORITY CLAIM

This patent application is a U.S. National Phase of co-pending International Patent Application No. PCT/EP2021/087106, filed Dec. 21, 2021, which claims priority to British Patent Application No. 2100241.5, filed Jan. 8, 2021, the disclosures of which are incorporated herein by reference in their entireties.

FIELD

The present disclosure relates to a reducing fibre optic cable tube connector.

BACKGROUND

Fibre bundles for telecommunications use are often laid in tubes in shallow trenches. The bundles consist of multiple optical fibres and are gradually split at various locations as they are fed in reduced bundles to different locations. Reducing connectors are used at these junctions. The tubes that are connected to reducing connectors vary in size, but typically have an outer diameter of between 5 mm and 20 mm. However, the reducing connectors can be applied to other tube diameters if necessary.

Once a number of tubes have been connected together end to end, they are laid in place and then buried. Sometime later, possibly around a year, the fibre optic cables are blown through the tubes.

In co-owned WO2021/005100, we disclose a connector with tubes of the same diameter which has features to provide improved impact resistance. In co-owned WO2021/005041, we describe a similar connector which has various features to prevent the snagging of optical fibres. The optical fibres are blown through a connector from some distance away in order to reduce any snagging in the interface between the tube ends. WO2021/005100 and WO2021/005041 are incorporated by reference herein as if set forth in their entireties.

SUMMARY

The present disclosure is aimed at addressing one or more of these issues. In particular, it provides a reducing connector having improved impact resistance features.

According to the present disclosure, there is provided a reducing fibre optic cable tube connector.

The requirement that first and second air gaps are spaced in an axial sense by less than 1 mm means that there must be an axial space of less than 1 mm between the gaps. There may be no axial gap at all, or the gaps may overlap in the axial sense (which is our current preference). If the gaps do overlap, this may be by more than 1 mm. For the avoidance of doubt, the 1 mm limitation refers to the minimum spacing between non-overlapping gaps.

At each end of the body there is an annular inner sleeve which receives the fibre optic cable tube and is spaced from an outer wall. This provides enhanced impact protection in that any impact on the side of the housing is not directly transmitted to the fibre optic cable tube given the presence of the first and second air gaps. Because the narrow inner sleeve extends axially very close to or beyond the wide inner sleeve, there is a very limited or no direct radial load path from outside the housing to the fibre optic cable tubes.

In the case of a small axial spacing between the air gaps, this may be small enough to effectively provide a constriction which reduces the transmission of any radial impact to the fibre optic cable tube to an acceptable level. The air gaps are radially offset from one another so that with a small axial spacing, the material between the ends of the two end gaps is effectively angled with respect to a radial plane. The radial load transmission is therefore further limited as this angled material limits the potential direct radial load transmission path.

The material between the ends of the air gaps may be circumferentially intermittent material (effectively providing an array of spokes rather than a continuous annular connection) to further limit load transmission. The intermittent material may extend tangentially to further limit load transmission.

The material between the ends of the air gaps can be relatively thin. In particular, it does not matter to the performance of a connector whether the material shears between the air gaps once the fibre optic cable tubes have been connected. This will not affect the sealing or gripping of the fibre optic cable tubes. Indeed, the fact that this part is effectively sacrificial provides a further degree of impact protection.

If the ends of the first and second air gaps are coplanar or the first and second air gaps partially overlap in an axial sense, any radial impact on the outer housing will encounter either the first or second air gap before it reaches either inner sleeve thereby enhancing the dissipation of the load through a connector body. This contrasts with WO2021/005100 where the inner sleeves were supported on a discrete web of material which, provides enhanced impact protection but potentially still provides a direct load path to the inner sleeve. While the web can be made smaller to reduce this effect, the extent to which this can be done is limited as the web represents a flow restriction during the moulding process.

The present connector does not have this issue as it uses a narrow or non-existent axial gap between the air gaps to reduce load transmission and therefore provides enhanced impact protection for a reducing connector in a manner which is robust and easy to mould.

Optionally, the connector further comprises an annular flange projecting into a through bore in a central region to provide an end stop for first and second tubes. This annular flange allows a well-defined surface to be created to provide a well-controlled end stop for each of the first and second tubes. An inner face of the annular flange is optionally tapered from a wide portion to a narrow portion. This effectively provides a guide surface to guide a fibre optic cable from the wide portion to the narrow portion.

The annular flange adjacent to the narrow portion is optionally configured to project radially inwardly to a greater extent than the inner diameter of the fibre optic cable tube to be received in the narrow portion. The inner most corner of the flange adjacent to the narrow portion is curved. This is a somewhat counter-intuitive step in that this means that the annular flange represents a constriction within the connector, which is even narrower than the inner diameter of the fibre optic cable tube received in the narrow portion. However, the fact that this provides a narrow constriction together with the curved inner most corner, provides a well-defined surface which is devoid of any abrupt angles. As such, the surface will readily guide the cable over the end of the narrow tube. If the end of the tube has any burrs or other non-uniformities, these will generally be out of the way of the cable behind the annular flange so they will not cause a snagging hazard.

Faces of the annular flange provide an end stop for the fibre optic cable tubes. The faces are optionally undercut such that, in use, they will make contact with a radially innermost part of a fibre optic cable tube with a planar end face ahead of a radially outermost part of the annular flange. This is done in order to minimize a gap between an inner diameter of the fibre optic cable tube and a location at which it meets the annular flange. For example, if an end of the fibre optic cable tube has not been cut square, a radially outermost diameter of the fibre optic cable tube will be located within the radially outermost part of the undercut portion of the annular flange such that the innermost part of the fibre optic cable tube is still located on or close to a radially innermost part of the annular flange.

The connector may be a grab ring. This has a plurality of inwardly angled flexible teeth which grip an inserted fibre optic cable tube. Any force tending to pull the fibre optic cable tube out of the connector causes the teeth to deflect thereby increasing the gripping force on the fibre optic cable tube.

However, optionally the connector further comprises a collet located in an open end of a connector body. The collet having a ring and a plurality of flexible legs extending generally axially of the ring into the connector body. The connector body having a tapered surface convergent towards the open end and the plurality of legs having heads at their distal ends for engaging both of the tapered surface and a fibre optic cable tube extending, in use, through the collet into the connector body. The heads of the plurality of legs can be compressed against the fibre optic cable tube by the tapered surface with outward movement of the collet with respect to the connector body to secure the fibre optic cable tube in the throughway.

The connector optionally further comprises a collet lock formed on the collet. The collet having a locked rotary position in which the collet lock holds the collet in an outward tube securing position and an unlocked rotary position in which the collet can move axially with respect to the throughway for release and engagement of a fibre optic cable tube by the collet. One of the connector body and the collet is provided with a cam surface and the other of the connector body and the collet is provided with a cam follower. The cam surface being configured to provide the locked and unlocked rotary positions.

Instead of a separate locking clip that is used in prior art reducing connectors, this uses a locking mechanism which is integrated into the reducing connector. This is much simpler to operate as there is no additional component which is relatively difficult to manipulate and easy to lose in the dirty environment of the trench. A locking clip can also be exposed to the dirt in the trench and can therefore be difficult to unlock should this be needed.

This type of collet is used in a single diameter connector disclosed in our earlier filing, WO2021/005319, which is incorporated by reference herein as if set forth in its entirety.

Because the locking is done by the interaction between the connector body and the collet, the locking mechanism can effectively be internal to the housing. This can provide a low profile design and also protect the locking mechanism from impact damage and from the ingress of dirt.

The cam surface can be provided either on the connector body or the collet, but is optionally on the connector body. In this case, the cam surface can be moulded directly on to the connector body as part of the body moulding process. However, this requires relatively complex tooling. Optionally, therefore, the connector body includes a cap retained by a main body portion, the cap being provided with the cam surface.

Optionally the collet ring does not protrude axially beyond the connector body. This protects the collect ring from impact damage and from dirt.

Optionally, the collet ring is recessed into the connector body.

The connector body is optionally devoid of outer ribs. The above-described inner sleeve arrangement provides good impact protection. As such, the outer ribs which are present on a number of prior art connectors are not required. The absence of ribs eliminates the possibility for dirt to accumulate on the outside of the connector.

Optionally, the connector body is a non-opaque body such that part of the through bore is visible, in use, from outside the connector body when fibre optic cable tubes are connected in place. This, together with the absence of outer ribs, provides good visibility into the connector body to allow an operator to verify that the fibre optic cable tubes are correctly located and to determine whether or not the fibre optic cable is running through the connector.

BRIEF DESCRIPTION OF THE DRAWINGS

An example of a reducing fibre optic cable tube connector will now be described with reference to the accompanying drawings, in which.

DETAILED DESCRIPTION

Figure 1:
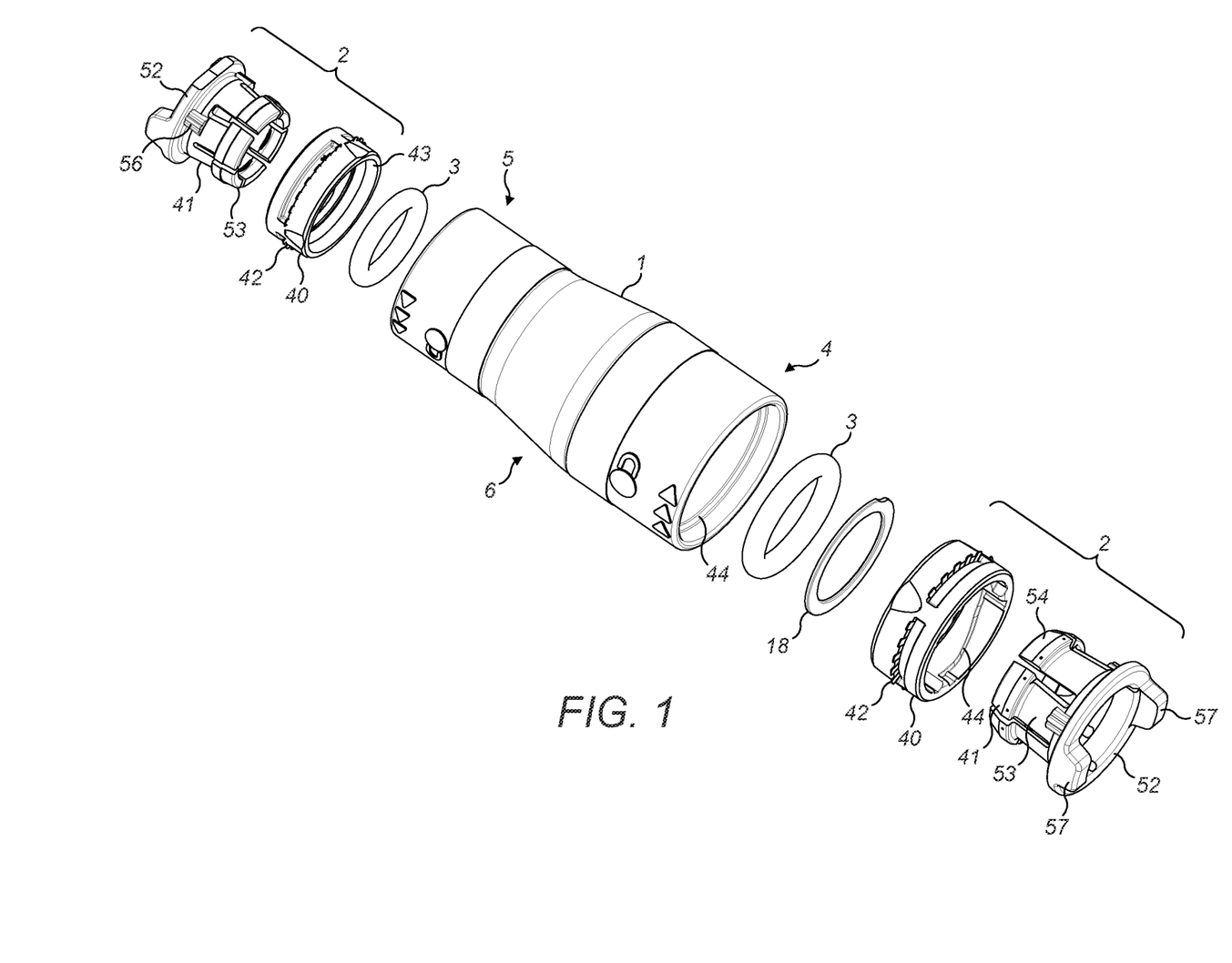
FIG. 1 is an exploded perspective view of the connector.
Figure 2:
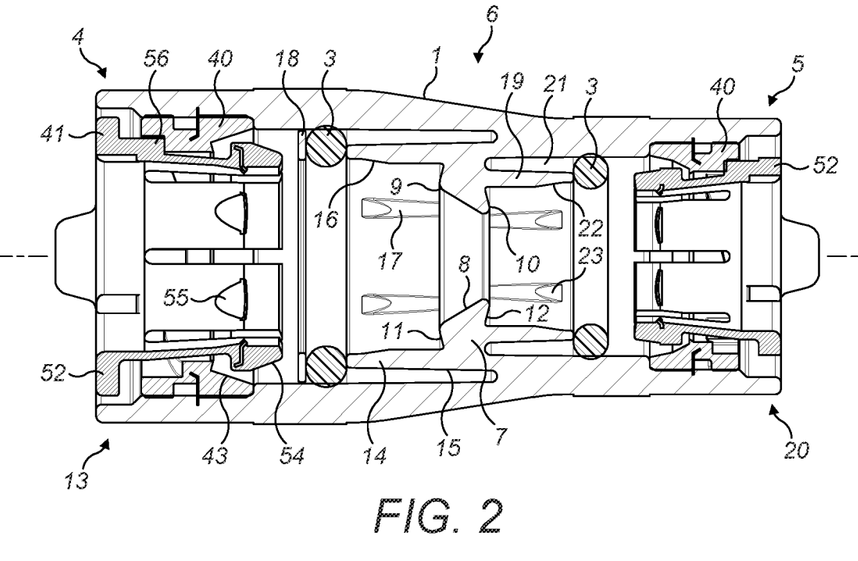
FIG. 2 is a cross-section through the connector in an axial plane with the components in a locked position.

Referring to FIGS. 1-2, a reducing fibre optic cable tube connector is depicted. The reducing fibre optic cable tube connector comprises a connector body 1 having a generally hollow cylindrical configuration centred on a main axis X. A connector 2 (described in greater detail below) is provided at either end to receive and grip a tube T (see FIG. 3) at each end which is sealed by an O-ring 3.

The connector body 1 is moulded from a non-opaque plastic. The plastic must be such that it is clear enough that a visual inspection externally of the reducing fibre optic cable tube connector allows an operator to determine whether a fibre or fibre bundle F (see FIG. 3) is present in the centre of the reducing fibre optic cable tube connector. Ideally, the connector body 1 should be as close to transparent as possible. However, practical considerations mean that the connector body 1 will not be truly transparent. Instead, the connector body 1 is likely to be translucent to a sufficient extent that the fibre is visible. Suitable materials are polycarbonate, polystyrene, polyester, acrylic and nylon. The connector body 1 is formed in a moulding process and can optionally be polished to improve the clarity of the connector body 1. As can be seen in the various figures, an outer profile of the connector body 1 is a smooth configuration which is devoid of external ribs thereby eliminating any stress concentrations and orifices for the accumulation of dirt.

The connector body 1 has a wide portion 4 and a narrow portion 5. The connectors 2 fitted in either end have the same construction as described below. The connector 2 in the narrow portion 5 is simply smaller than that of the wide portion 4. The shape of the connector body 1 in the central region 6 is, however, different in order to accommodate the transition from the wide portion 4 to the narrow portion 5.

Figure 3:
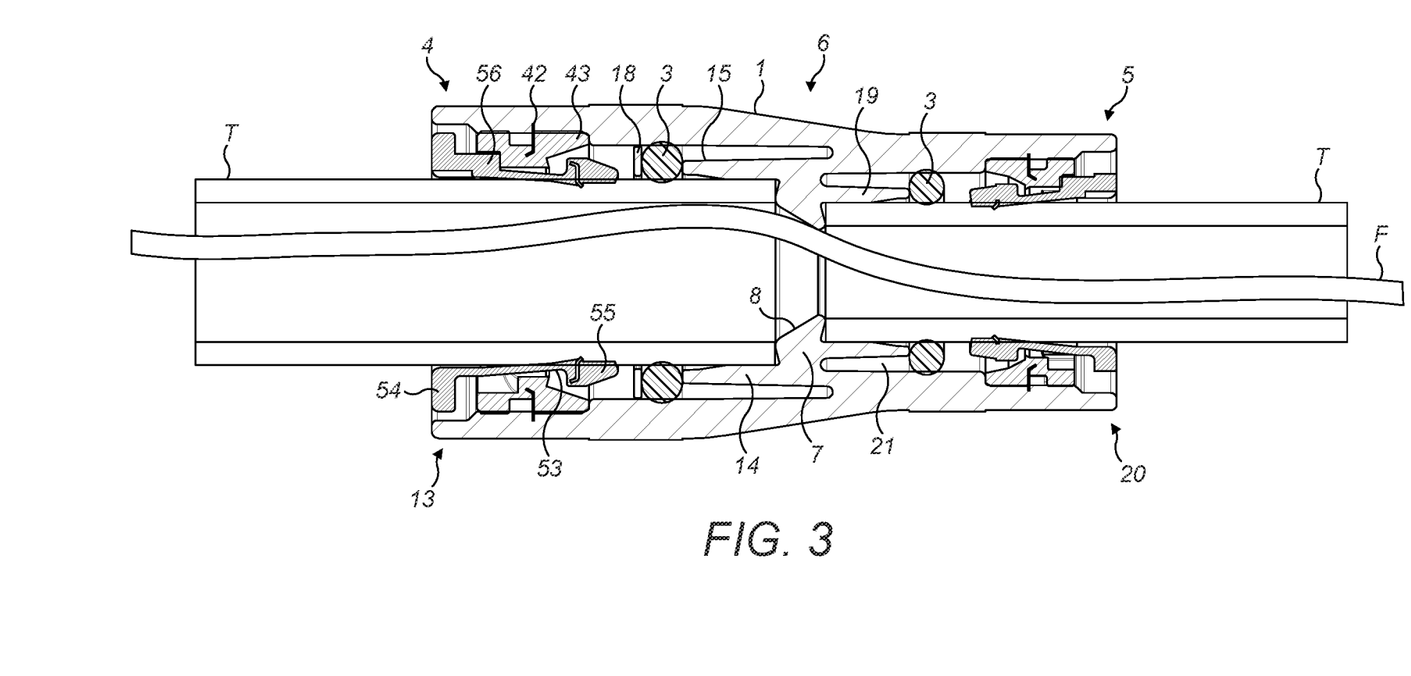
FIG. 3 is a view similar to FIG. 2 showing the tubes and a fibre optic cable in place.

At the transition between the wide portion 4 and narrow portion 5 is an annular flange 7. The annular flange 7 has a tapered inner surface 8 which tapers inwardly from the wide portion 4 to the narrow portion 5. The annular flange 7 provides an end stop for the tubes T as shown in FIG. 3. Corners 9 of the tapered inner face 8 have a smoothly curved profile so as to avoid any sharp corners which might provide a snagging hazard for a fibre F fed through the connector. The corner 9 adjacent to the wide portion 4 is configured to have a diameter which is approximately the same as an inner diameter of the tube T in the wide portion 4. The corner 9 facing the narrow portion 5, as shown in FIG. 3, is designed to have an inner diameter which is smaller than an inner diameter of the tube T in the narrow portion 5. As is apparent from FIG. 3, this, together with the smoothly curved profile of the corner 9, will guide the fibre F over the end of the narrow tube T as the inner diameter of the tube T is behind the annular flange 7 and the fibre F is helped over the end of the tube by the smoothly curved corner 9.

As is apparent from FIGS. 2 and 3, each of the axial end faces 11, 12 of the annular flange 7 is provided with an undercut. In practice, this means that each end face 11, 12 is inclined so that the part of the annular flange towards the innermost extremity extends axially towards the respective open end of the reducing fibre optic cable tube connector to a greater extent than the radially outermost part of the annular flange 7. The effect of this is shown in FIG. 3. From this, it is clear that the inner diameter of a respective tube T will engage first with a radially innermost portion of the annular flange 7. This is done in order to minimize the gap between the annular flange 7 and the tube T as such a gap might otherwise provide a snagging hazard. As shown in FIG. 3, the end of each tube T is cut precisely in a radial plane. However, in practice, should the end of the tube T be cut at a slightly oblique angle, or if there are any burrs formed on the tube T, if these were towards the outermost portion of the tube T, they could hold the tube T away from the annular flange 7 thereby enlarging the gap between the tube T and the annular flange. With the current design, any such misalignment or burrs at the outermost portion of the tube T can be accommodated, to some extent, in the undercut portion thereby minimizing or eliminating any gap between the tube T and the annular flange 7.

Projecting axially from the annular flange 7 towards the wide end 13 is an annular inner sleeve 14 creating an air gap 15 between the annular inner sleeve 14 and the connector body 1. The annular inner sleeve 14 is designed to receive the tube T within the inner sleeve 14. The annular inner sleeve 14 is also provided with a lead-in chamfer 16 and axial splines 17. The lead-in chamfer 16 facilitates the location of the tube T within the annular inner sleeve 14, while the spines 17 are configured to widen towards the annular flange 7. If the tube T is supplied on a reel, it may have a slightly oval configuration when it is inserted into the reducing fibre optic cable tube connector. The spines 17 will help to deflect the oval configuration towards a circular configuration which, again will avoid any snagging hazards and also ensure that the seal with the O-ring 3 is adequately maintained.

As can be seen in FIGS. 2 and 3, the O-ring seal 3 in the wide portion 4 is held in place between an end of the annular inner sleeve 14 and a washer 18 which is retained within the connector body 1. This is provided in the wide portion to meet burst pressure requirements by preventing the O-ring seal 3 deforming into collet legs 53. Depending on the relative dimensions of the reducing fibre optic cable tube connector, a similar washer may be provided in the narrow portion 5. No such washer is illustrated in the present example as the dimensions in this example are too small to require this.

The narrow portion 5 of the reducing fibre optic cable tube connector is a scaled-down version of the structure described above in relation to the wide portion. In particular, an annular inner sleeve 19 extends axially from the annular flange 7 towards a narrow end 20 creating an air gap 21 between the annular inner sleeve 19 and the connector body 1. The tube T in the narrow portion 5 is received within this annular inner sleeve 19.

As is apparent from FIGS. 2 and 3, the air gaps 15, 21 overlap one another slightly in the axial sense in the vicinity of the annular flange 7. As a result of this, there is no direct radial load path from outside the connector body 1 to the annular inner sleeves 14, 19. Thus, any radial impact cannot be directly transmitted via the connector body 1 to the tube T. Instead, any such impact will simply cause the outer wall of the connector body 1 to deflect inwardly into the respective air gap 15, 21. Only in an extreme case would an impact be sufficient to also deflect the annular inner sleeves 14, 19. In practice, therefore, this design provides the required levels of impact protection required for such a reducing fibre optic cable tube connector.

As well as providing enhanced impact protection, the air gaps 15, 21 provide additional benefits. Without them, the wall of the housing surrounding the tube would be significantly thicker to preserve the constant external radius of the housing. A thick part will cool unevenly leading to clouding of the plastic material and loss of transparency. The thicker material is also stiffer and is therefore more prone to cracking and therefore creating leakage paths under impact, as opposed to the above described arrangement which can deflect more readily. The air gaps 15, 21 therefore contribute to enhanced transparency and better resiliency of the housing.

The annular inner sleeve 19 is provided with a similar lead-in chamfer 22 and splines 23 which serve the same purpose as the lead-in chamfer 16 and splines 17 described in relation to the wide portion 4. No washer equivalent to the washer 18 in the wide end is illustrated at the narrow end, although this could be present if required.

The connectors 2 (one at each end of the connector body 1) will now be described in greater detail. The reducing fibre optic cable tube connectors have the same construction, but the connector in the wide end 13 is larger than the one in the narrow end 20. The description below applies equally to both.

The connectors 2 are formed of two components, namely a cartridge 40 and a collet 41.

Figure 4:
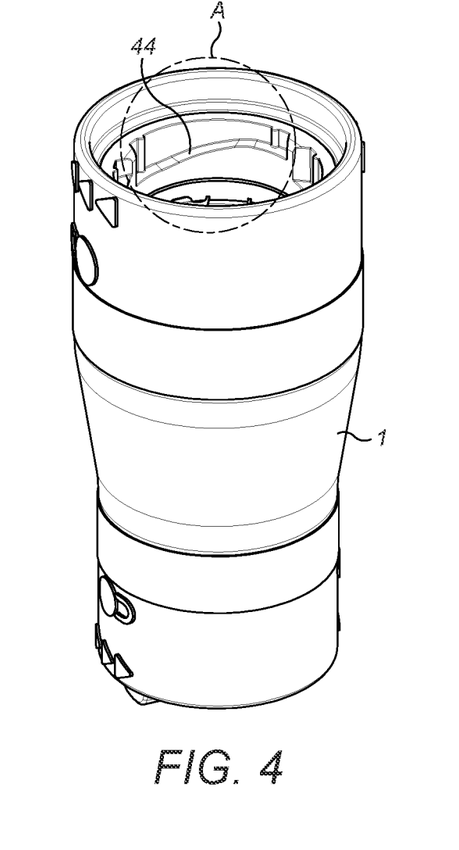
FIG. 4 is a perspective view of the body and cartridge from above.
Figure 4A:
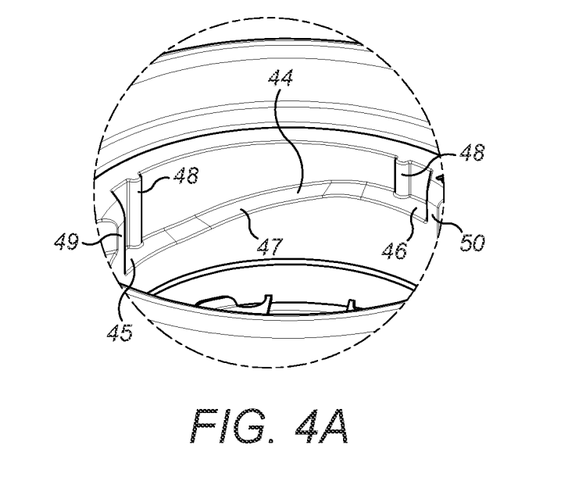
FIG. 4A shows the detail in the circle labelled A in FIG. 4.
Figure 5:
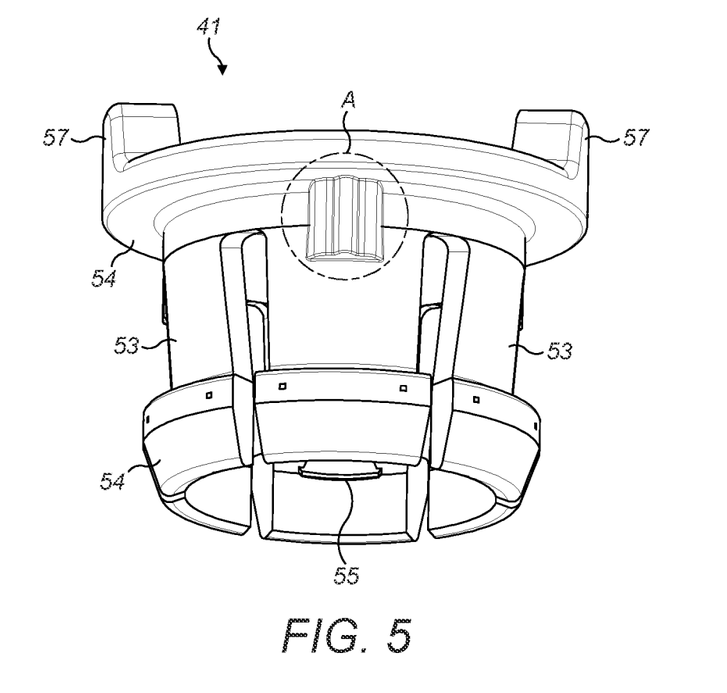
FIG. 5 is a perspective view from below of the collet.
Figure 5A:
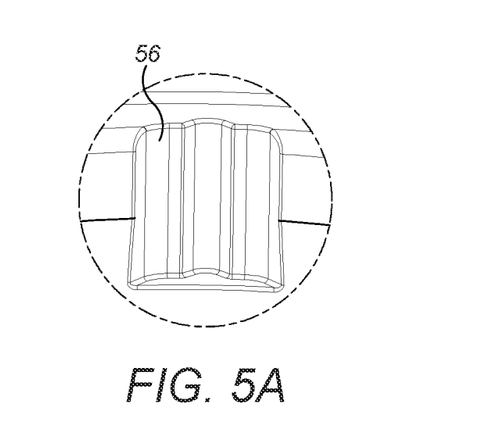
FIG. 5A shows the detail in the circle A in FIG. 5.

The cartridge 40 has a generally annular configuration. The outer surface is provided with a plurality of flexible metal teeth 42. The cartridge 40 is inserted into an end of the connector body 1. The teeth 42 grip the wall of the connector body 1 to ensure that the cartridge 40 is permanently retained in the connector body 1. At the end of the cartridge 40, there is a tapered cam surface 43 which cooperates with the collet 41 as described below. At the opposite end, the end face of the cartridge 40 is provided with a pair of ramped surfaces 44 (see FIG. 4A). Although two such surfaces are shown, there may be a single surface or there may be more than two. Each ramp surface has a low point 45 corresponding to an unlocked configuration and a high point 46 corresponding to a locked configuration within an inclined face 47 in between. Bumps 48 are provided at the interface between the high point 46 and the inclined face 47 and between the inclined face 47 and the low point 45. The low point 45 terminates at a first end stop 49 and the high point 46 terminates at a second end stop 50.

Most of the features of the collet 41 are conventional. It has a collet ring 52 from which a plurality of flexible legs 53 extend. Each arm has a head 54 at its distal end as is provided with an inwardly projected metal tooth 55.

With a tube T inserted for example as shown in FIG. 3, any movement tending to pull the tube T out of the connector causes the teeth 55 to grip into the tube T, this pulls the heads 54 towards the tapered cam surface 43 on the cartridge 40 deflecting the legs 53 inwardly to provide a progressively increasing gripping force on the tube T. This serves to hold the tube T securely in place. This is the conventional manner in which a collet operates.

Figure 6:
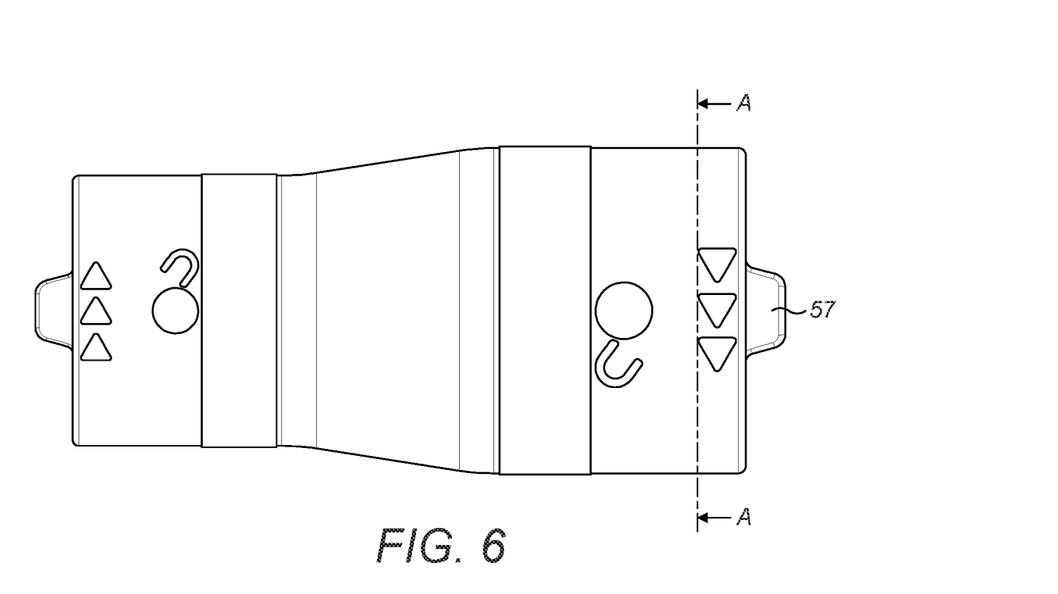
FIG. 6 is a side view of the connector in a locked position.
Figure 6A:
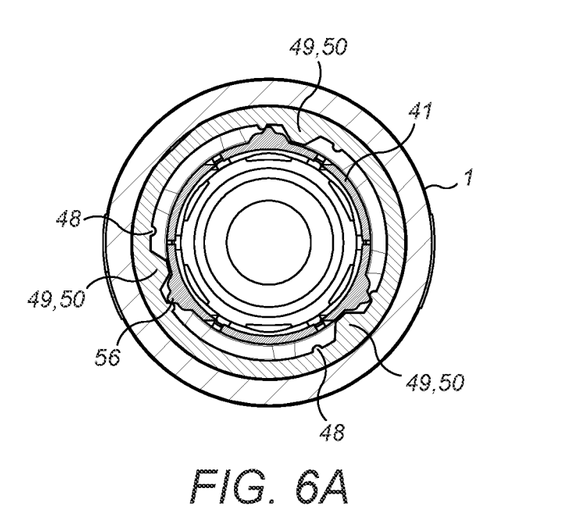
FIG. 6A is a cross-section taken through line A-A in FIG. 6.

The collet further comprises cam followers 56 extending from the collet ring 52 towards the ramped surface 44 on the cartridge 40. Although three followers 56 are used in the present example (see FIGS. 6A and 7A), in practice there are as many followers 56 as there are ramped surfaces 44. Alternatively, the cam arrangement may be inverted such that the ramped surface(s) is/are on the collet and the follower(s) is/are on the cartridge.

The collet ring 52 is also provided with a pair of tabs 57 which extend from the collet ring 52 the opposite direction to the followers 56.

Figure 7:
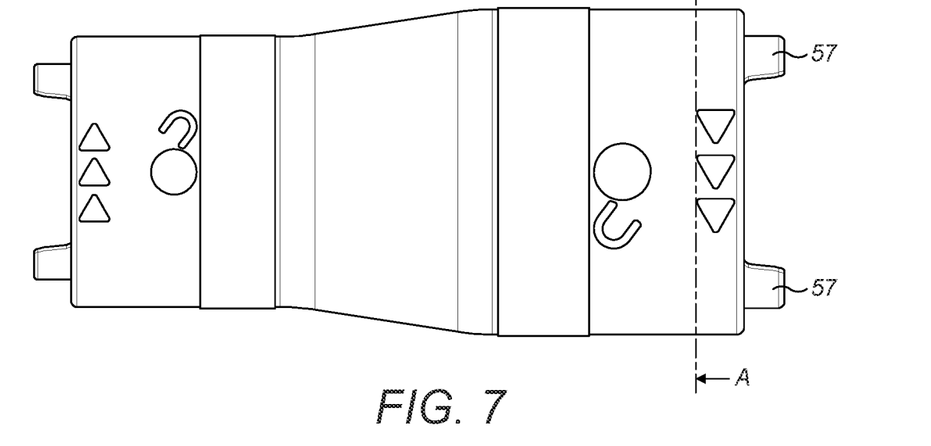
FIG. 7 is a view similar to FIG. 6 in the unlocked position.
Figure 7A:
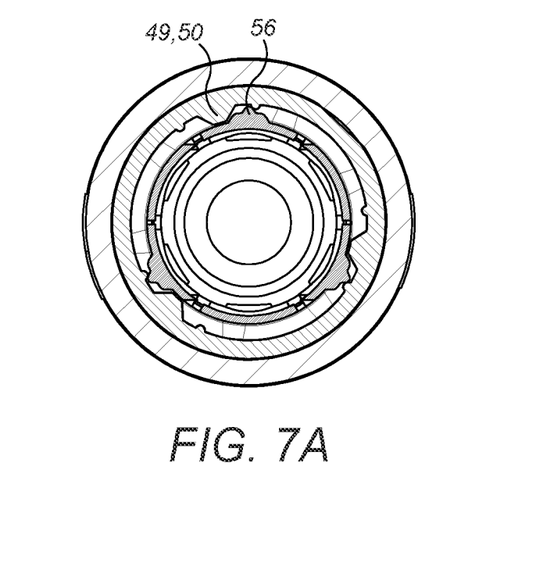
FIG. 7A is a cross-section through line A-A in FIG. 7.

The operation of the collet will now be described with reference to FIGS. 4 to 7. The position shown in FIG. 7A is an unlocked position. In this position, the collet 41 has been rotated such that cam followers 56 abut the first end stops 49 such that the cam followers 56 are at the low point 45 (see FIG. 4A). In this position, the collet 41 has a relatively large degree of axial freedom. If held in a depressed position by a user, the tube T can be withdrawn because the heads 54 are kept away from the tapered cam surface 43 such that the collet 41 cannot grip the tube T. The collet 41 then is rotated into the locked position shown in FIG. 6A. In doing so, the followers 56 move up the inclined faces 47, over the bumps 48, providing a tactile feel to the user that a position has been reached, and onto the high point 46 (see FIG. 4A).

In the locked position, the collet 41 has nothing like the same degree of freedom as in the unlocked position so that it cannot be moved and held in an unlocked position where the teeth 55 disengage with the tube T.

The tube T can be inserted with the collet 41 in the unlocked position as this allows for more scope for the legs 53 to be deflected upon insertion of the tube T. However, even in the locked position, there can be a small clearance between the head 54 and the tapered cam surface 43. Thus, it is possible to insert the tube T with the collet 41 in the locked position. This can provide a simple assembly process. In this regard, the user needs only to insert the tube T into the collet 41, and they do not need to concern themselves with the locking operation.

The only way to remove the tube T in this locked configuration is for the user to grasp the tabs 57, rotate the collet 41 to the unlocked position, and manually hold the collet 41 inwardly while pulling the tube T out of the connector body 1.

As can be best seen from FIGS. 2 and 3, the collet ring 52 is axially set back inside the connector body 1. However, the tabs 57 extend beyond the end of the connector body 1. In this position, the collet 41 is protected from external impacts by the connector body 1. Further, because it is recessed within the connector body 1, it is, to some extent, shielded from the soil in which the cables are buried. With this connector, the only points where dirt or other particulates can potentially enter internal workings of the connector are between the collet ring 52 and the tube T, and between the collet ring 52 and the connector body 1. However, these are interfaces where tight tolerances can be applied. Any dirt entering here cannot impair the visibility of the fibre F within the connector body 1. Further, because of the rotary action required to unlock the collet 41, even if some dirt does enter into these gaps, this is unlikely to jam the collet 41 in place as a rotary motion can readily generate sufficient torque to overcome any such sticking.

The tabs 57 have right angled corners. This allows them to be inserted into a cut end of a tube T and scraped around the inner edge of the tube to remove any burrs which are formed during the cutting operation and which might otherwise create a snagging hazard for the fibre F. The edge may be shaped in a different way to provide more effective burr removal.

The invention claimed is:

1. A reducing fiber optic cable tube connector, the reducing fiber optic cable tube connector comprising:
    a connector body made of a plastic, the connector body defining a through bore and having a connector at either end for connection to a respective tube;
    the connector body having a wide portion terminating at a wide end and a narrow portion terminating at a narrow end, the wide end being dimensioned to receive a first tube of a first diameter and the narrow end being dimensioned to receive a second tube of a second diameter smaller than the first diameter, the wide and narrow portions meeting at a central region of the connector body;
    the wide portion of the connector body comprising a wide outer body and an annular wide inner sleeve extending from the central region towards the wide end, an outer wall of the annular wide inner sleeve being generally spaced from an inner wall of the wide outer body to define a first air gap, a distal end of the first tube being receivable within the annular wide inner sleeve;
    the narrow portion of the connector body comprising a narrow outer body and an annular narrow inner sleeve extending from the central region towards the narrow end, an outer wall of the annular narrow inner sleeve being generally spaced from an inner wall of the narrow outer body to define a second air gap, a distal end of the second tube being receivable within the annular narrow inner sleeve; and
    an annular flange projecting into the through bore in the central region to provide an end stop for the first and second tubes; and
    wherein, at the central region, the annular narrow inner sleeve extends towards the annular wide inner sleeve such that the first and second air gaps are spaced in an axial sense by less than 1 mm.

2. A reducing fiber optic cable tube connector according to claim 1, wherein the first and second air gaps are coplanar or the first and second air gaps partially overlap in an axial sense.

3. A reducing fiber optic cable tube connector according to claim 1, wherein the annular narrow inner sleeve extends partially into the annular wide inner sleeve such that the first and second air gaps partially overlap in an axial sense.

4. A reducing fiber optic cable tube connector according claim 1, wherein an inner face of the annular flange is tapered from the wide portion to the narrow portion.

5. A reducing fiber optic cable tube connector according to claim 1, wherein the annular flange adjacent to the narrow portion is configured to project radially inwardly to a greater extent than an inner diameter of the second tube to be received in the narrow portion, and wherein an innermost corner of the annular flange adjacent to the narrow portion is curved.

6. A reducing fiber optic cable tube connector according to claim 1, wherein faces of the annular flange are undercut such that, in use, the faces of the annular flange will make contact with a radially innermost part of a respective one of the first and second tubes, wherein the faces of the annular flange provide the end stop for the first and second tubes, wherein a planar end face of the annular flange is ahead of a radially outermost part of the respective one of the first and second tubes.

7. A reducing fiber optic cable tube connector according to claim 1, further comprising a collet located in an open end of the connector body, the collet having a ring and a plurality of flexible legs extending generally axially of the ring into the connector body, the connector body having a tapered surface convergent towards the open end and the plurality of flexible legs having heads at their distal ends for engaging both of the tapered surface and a tube extending, in use, through the collet into the connector body, the heads being compressed against the tube by the tapered surface with outward movement of the collet with respect to the connector body to secure the tube in the through bore.

8. A reducing fiber optic cable tube connector according to claim 7, further comprising a collet lock formed on the collet, the collet lock having a locked rotary position in which the collet lock holds the collet in an outward tube securing position and an unlocked rotary position in which the collet can move axially with respect to the through bore for release and engagement of a respective one of the first and second tubes by the collet; wherein one of the connector body and the collet is provided with a cam surface and the other of the connector body and the collet is provided with a cam follower, the cam surface being configured to provide the locked and unlocked rotary positions.

9. A reducing fiber optic cable tube connector according to claim 8, wherein the cam surface is on the connector body.

10. A reducing fiber optic cable tube connector according to claim 9, wherein the connector body includes a cap retained by a main body portion, the cap being provided with the cam surface.

11. A reducing fiber optic cable tube connector according to claim 8, wherein the ring does not protrude axially beyond the connector body.

12. A reducing fiber optic cable tube connector according to claim 11, wherein the ring is recessed into the connector body.

13. A reducing fiber optic cable tube connector according to claim 1, wherein the connector body is devoid of outer ribs.

14. A reducing fiber optic cable tube connector according to claim 1, wherein the connector body is a non-opaque body such that part of the through bore is visible, in use, from outside the connector body when the first and second tubes are connected in place.

15. A reducing fiber optic cable tube connector, the reducing fiber optic cable tube connector comprising:
a connector body that has a first end and an opposite, second end, the first and second ends together defining a through bore;
a first connector at the first end of the connector body for connection to a first tube;
a second connector at the second end of the connector body for connection to a second tube;
the connector body having a wide portion terminating at a wide end and a narrow portion terminating at a narrow end, the wide end being dimensioned to receive the first tube of a first diameter and the narrow end being dimensioned to receive the second tube of a second diameter smaller than the first diameter, the wide and narrow portions meeting at a central region of the connector body; and
a first collet located in the first end of the connector body, the first collet having a first ring and a plurality of flexible legs extending generally axially of the first ring into the connector body, wherein the first ring does not protrude axially beyond the connector body;
wherein the wide portion of the connector body includes a wide outer body and an annular wide inner sleeve extending from the central region of the connector body towards the wide end, an outer wall of the annular wide inner sleeve being generally spaced from an inner wall of the wide outer body to define a first air gap, a distal end of the first tube being receivable within the annular wide inner sleeve;
wherein the narrow portion of the connector body includes a narrow outer body and an annular narrow inner sleeve extending from the central region of the connector body towards the narrow end, an outer wall of the annular narrow inner sleeve being generally spaced from an inner wall of the narrow outer body to define a second air gap, a distal end of the second tube being receivable within the annular narrow inner sleeve; and
wherein, at the central region, the annular narrow inner sleeve extends towards the annular wide inner sleeve such that the first and second air gaps are spaced in an axial sense by less than 1 mm.

16. A reducing fiber optic cable tube connector according to claim 15, further comprising an annular flange projecting into the through bore in the central region to provide an end stop for the first and second tubes.

17. A reducing fiber optic cable tube connector according claim 16, wherein an inner face of the annular flange is tapered from the wide portion to the narrow portion.

18. A reducing fiber optic cable tube connector according to claim 15, wherein the connector body is devoid of outer ribs.

* * * * *